Sept. 16, 1930.  J. P. CRUISE  1,775,890
COTTON PICKER
Filed March 30, 1928    4 Sheets-Sheet 3
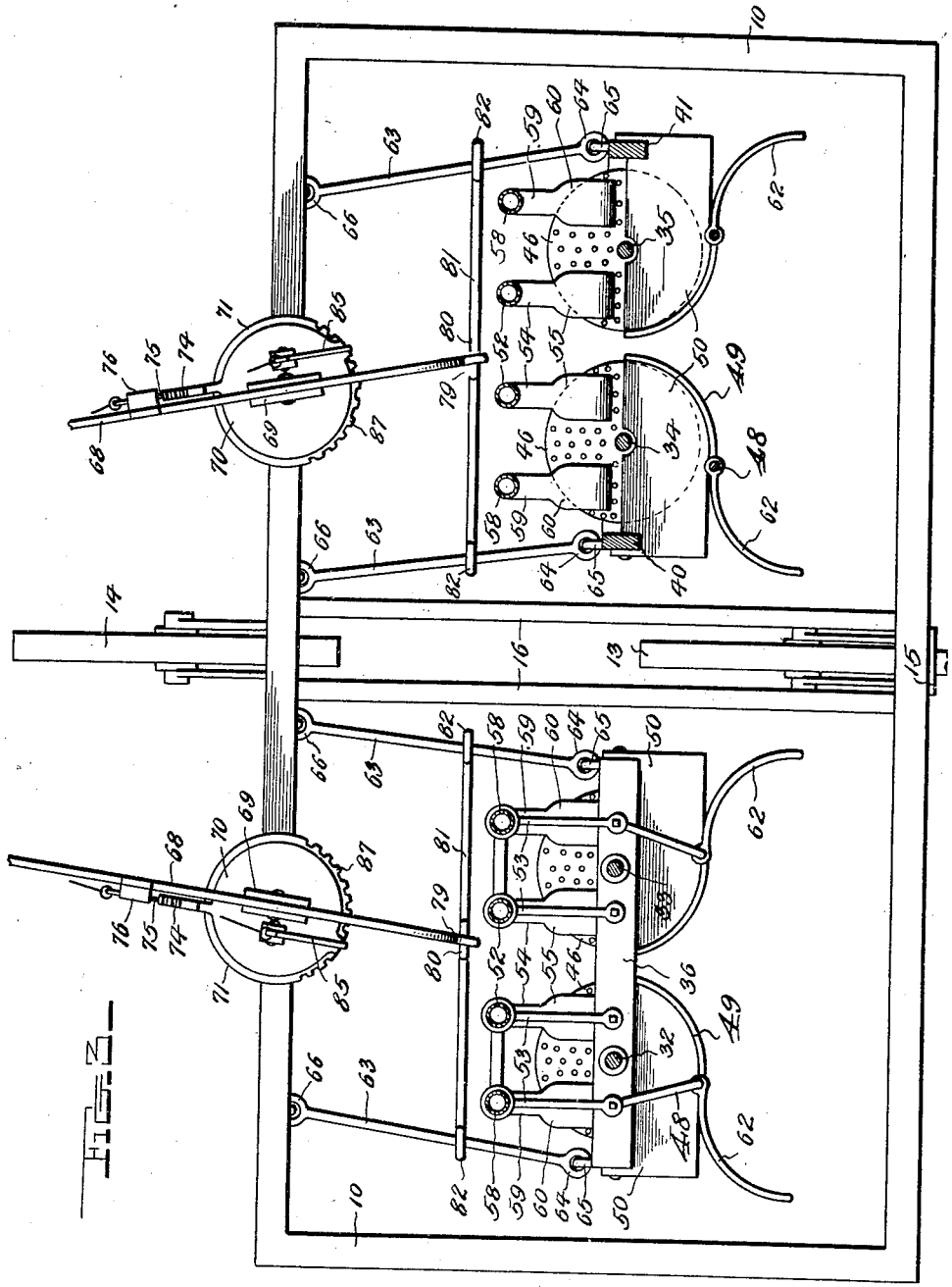
Inventor
J. P. Cruise
By Townshend + Townshend
Attys.

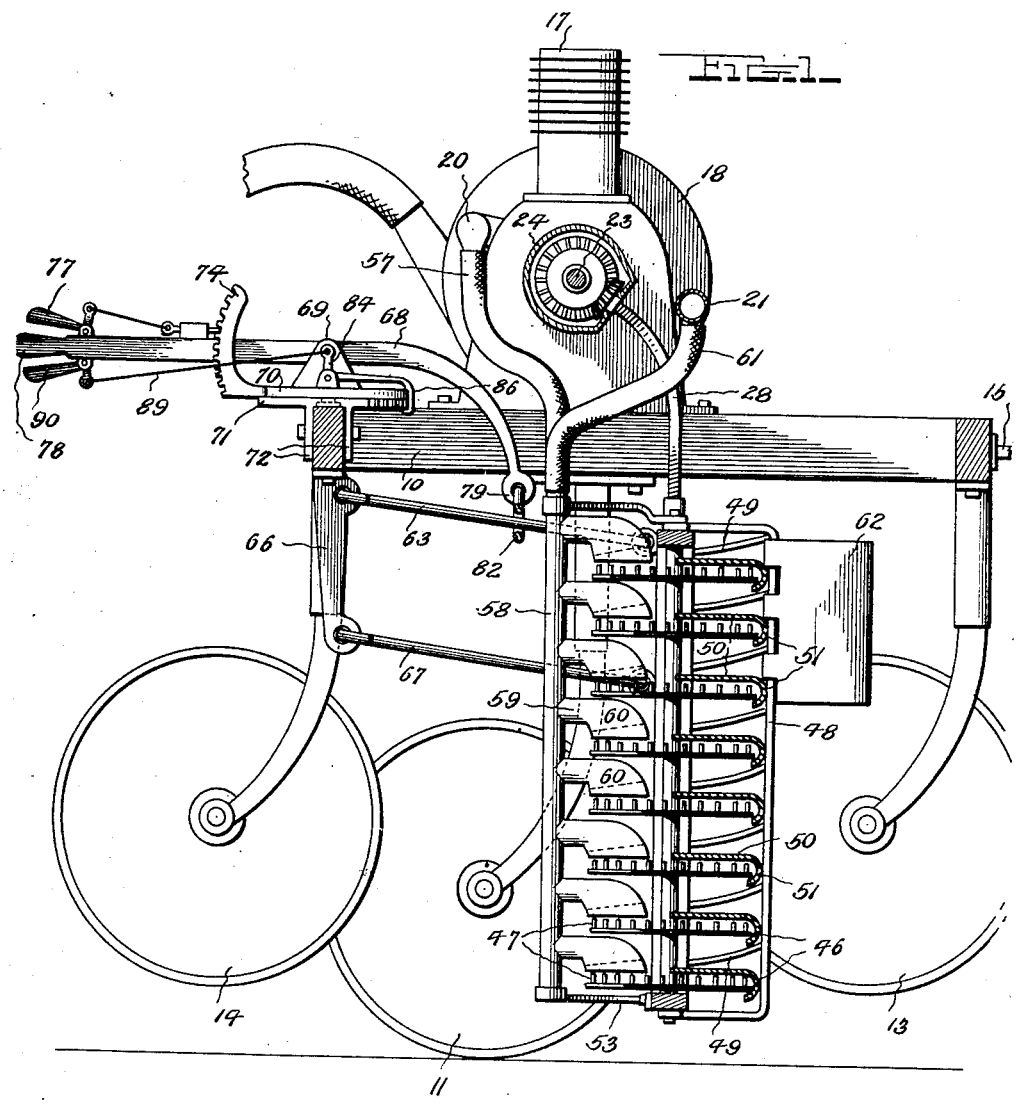

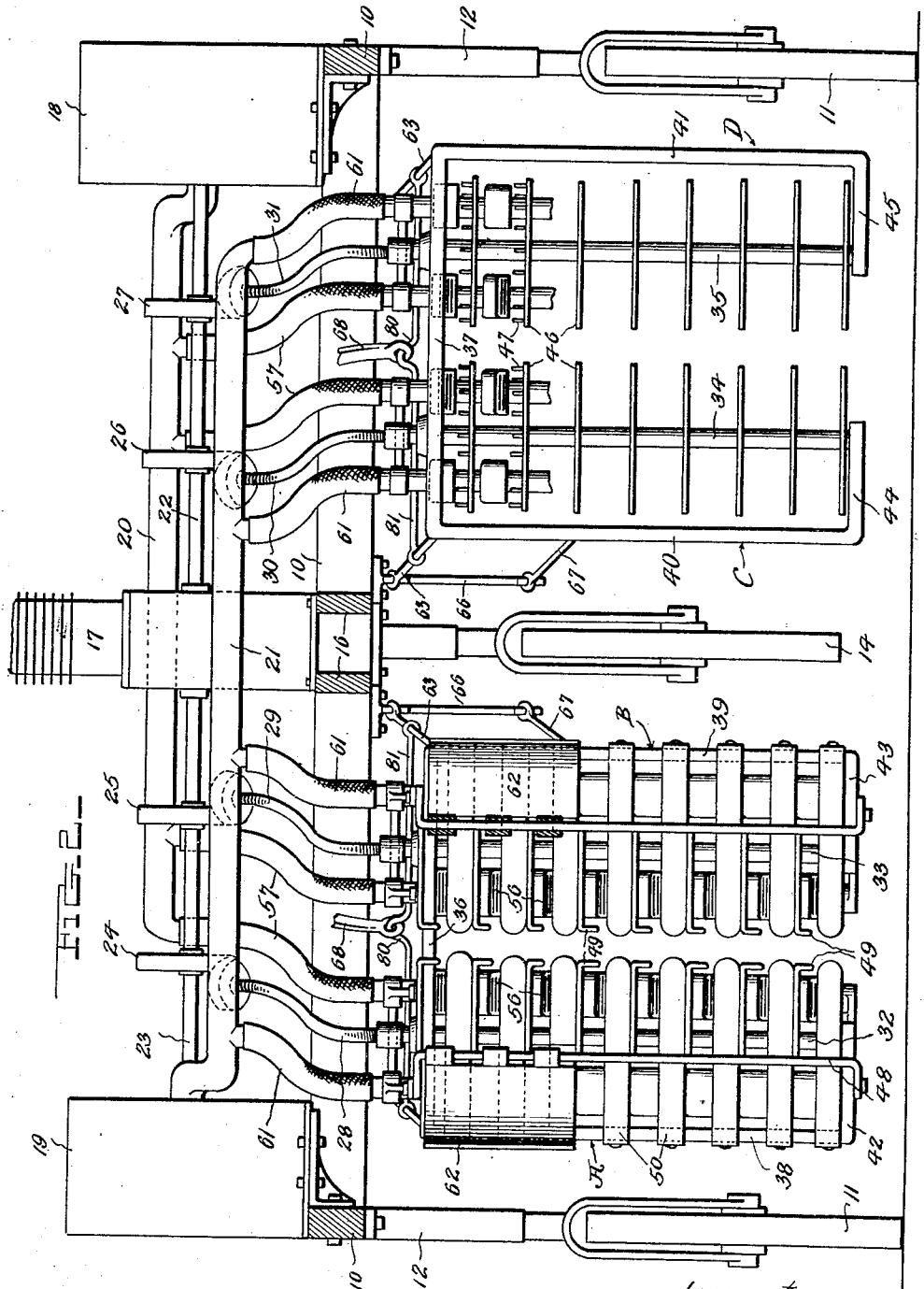

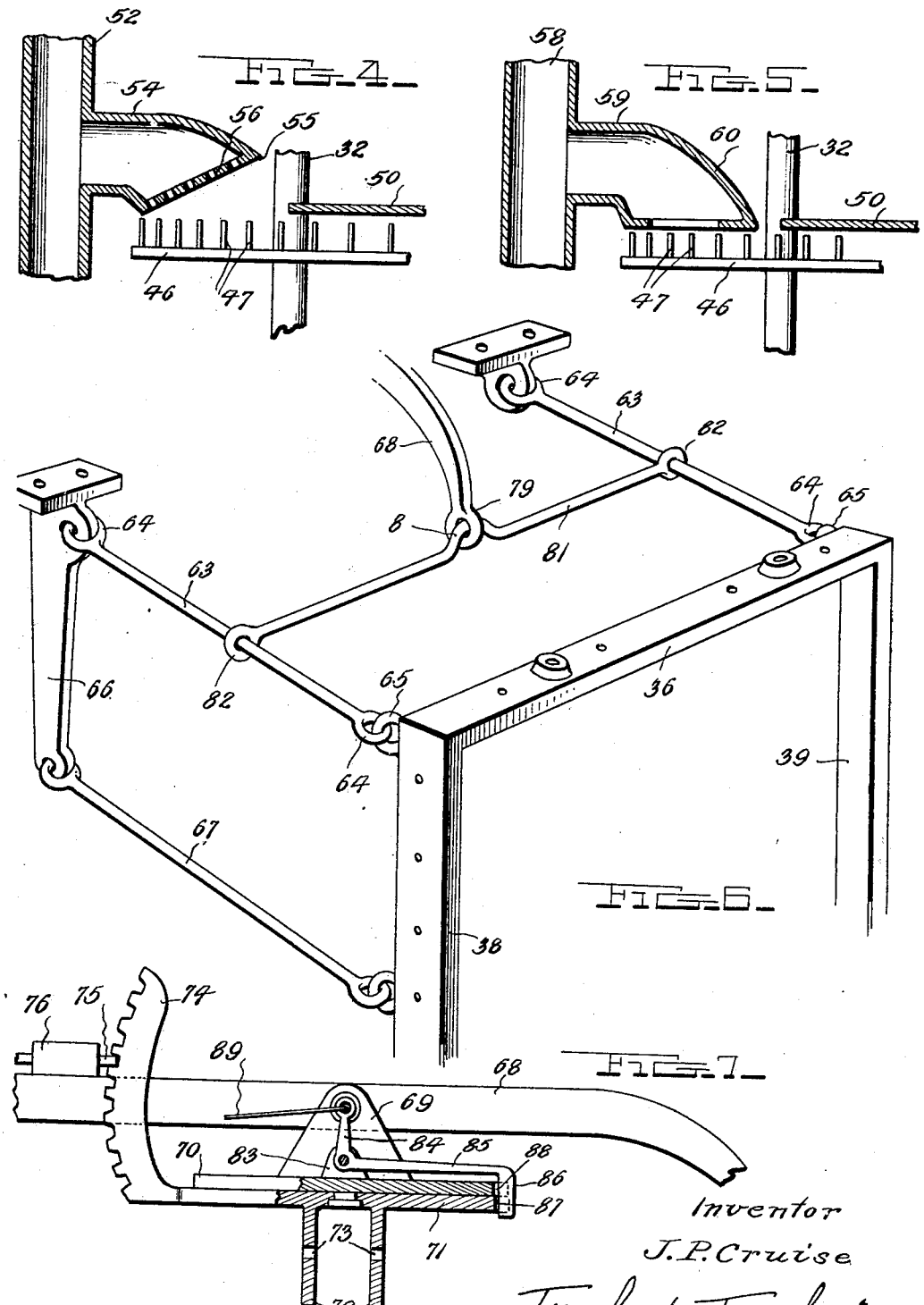

Patented Sept. 16, 1930

1,775,890

UNITED STATES PATENT OFFICE

JAMES P. CRUISE, OF UTICA, MISSISSIPPI

COTTON PICKER

Application filed March 30, 1928. Serial No. 265,883.

My invention relates to machines for gathering cotton from the stalks of the plant, to replace manual labor generally employed. The invention has particular reference to draft apparatus adapted to straddle and operate upon a single row or a plurality of cotton rows during travel across the field.

Heretofore in this art many various machines have been proposed for accomplishing the picking of cotton from the plant but they have in general proved impractical due to various structural deficiencies and in general they have not been designed to accommodate varying heights of cotton rows and varying widths between such rows and flexibility in being turned at the end of the rows so as to pick cotton to the end of the rows. Furthermore machines heretofore proposed have been objectionable in that in many instances no provision is made for separating dead leaves, twigs and trash from the cotton as it is picked from the plant. This naturally results in a product which is a very inferior grade and necessitates cleaning after picking.

Among the objects which the present invention has in view are: to provide in a cotton picking machine means for separating dead leaves, twigs and such like trash material from the cotton before the cotton is picked from the plant by operation of the machine; to provide in a cotton picking machine a novel pneumatic separating and picking means whereby the machine functions through suction to gather cotton from the picker plates as they take the cotton from the stalks of plants; to provide in a machine of this character a novel means for regulating the effective number of picker units employed; to provide in a machine of this character a novel structural arrangement of picker units and cooperating guide means for the stalks and branches of cotton plants; to provide in a machine of this character a novel means for adjusting the effective operating height of the picker units; to provide in a machine of this character a novel means whereby relative adjustment may be had between the picker units and the machine frame in a plurality of directions; and to provide a flexible means of picking cotton up to the end of the rows.

With these and such other objects in view as will be apparent from the description, the invention resides in the novel construction, combination and arrangement of parts hereinafter described and claimed and illustrated in the accompanying drawings, wherein:—

Figure 1 is a side elevation of a machine constructed in accordance with the principles of my invention.

Figure 2 is an end elevation, partly in section, from the right of Figure 1 and illustrating the forward end of the machine.

Figure 3 is a top plan view of certain elements of the machine, the super-structure and a number of parts having been removed for clearness of detail.

Figure 4 is an elevation, partly in section, illustrating the cooperative relation between a picker element and the trash separating means.

Figure 5 is a similar elevation illustrating the cooperation between a picker element and a cotton picking means.

Figure 6 is a perspective of the link connection means whereby vertical and horizontal adjustment of the picker elements is obtained within the machine.

Figure 7 is a fragmentary section through the operating means employed for effecting the adjustment of the picker units within the frame.

In its general aspects my invention comprises a wheeled frame carrying a plurality of picker units rotatably mounted on vertically disposed shafts which are driven from power means disposed at a suitable point in the main frame. These picker units are adapted to engage and pluck off the cotton from plants which are guided into engagement with the picker units through means of suitably formed guiding arms which direct the stalks and branches of the cotton plants between and into the picker units. Cooperating with these picker units there is arranged a plurality of suction means operating to extract dead leaves, twigs and trash material from the cotton plant and hold green leaves away from the picker points of the plates before the plucked cotton engages the suction means for carrying it into a suitable collection receptacle disposed on the frame. The machine is also provided with means for adjusting the operative action of a desired vertical number of picker units and in order to accommodate for irregularity in height and width between the cotton rows, means are provided for adjusting the picker units to accommodate such irregularities.

In detail the invention comprises a substantially rectangular main frame 10 having a relatively greater width than length as best illustrated in Figure 3, and which is supported at opposite sides upon bearing wheels 11 arranged in vertical standards 12 having rigid attachment to the side bars of the frame 10.

The front and rear ends of the frame carry supplemental supporting wheels 13 and 14 which terminate normally in spaced relation above the ground so that they are normally held out of engagement with the ground surface when the machine is being propelled over a field of cotton plants. The forward end bar of the frame carries suitable power traction engaging means 15, which may be of any construction desired and the supplemental wheels 13 and 14 are aligned longitudinally in the frame, being located intermediate opposite sides thereof. These supplemental wheels function to support the frame when any variation in ground surface requires such support and when the machine is disconnected from its power traction means.

Intermediate the opposite side bars of the frame are disposed a pair of parallel brace beams 16 extending from front to rear of the machine and forming a frame support in conjunction with side bars of the frame for carrying elements of the superstructure of the machine, which elements consist in a centrally disposed prime mover, such as an internal combustion engine 17 and fan assemblies 18 and 19 disposed on opposite sides of the machine. It will be understood that the fan assemblies 18 and 19 comprise the conventional casing arrangement containing internally mounted fans, not shown, for creating a suction through their respective intake conduits 20 and 21, the respective fans being driven from shafts 22 and 23 receiving their power from the motor 17.

Between each of the fan assemblies 18 and 19 and the motor 17, the respective drive shafts 22 and 23 are provided with gear boxes 24, 25, 26 and 27, through which the positive drive of the shafts is transmitted by way of flexible shafts 28, 29, 30 and 31 down to four vertically arranged picker unit shafts 32, 33, 34 and 35, which shafts have upper and lower end bearings through two substantially U-shaped strap frames 36 and 37. These strap frames have depending arms 38, 39, 40 and 41 formed with inturned bottom portions 42, 43, 44 and 45, which receive the lower ends of the shafts 32, 33, 34 and 35, terminating in opposed spaced relation a sufficient distance apart, as best shown in Figure 2, to permit of the ready entry therebetween of the stalks of cotton plants straddled by the picker units carried by the machine.

Each of these picker units has rigidly mounted on its respective vertical drive shaft a vertically spaced series of parallel annular plates 46 provided on their upper faces with a plurality of upstanding picker fingers 47 in the form of vertical prongs which extend a relatively short distance above the plate and are designed to engage in the cotton carried on plants engaged by the machine. The respective picker units are generally designated as at A, B, C and D and it is to be noted that the plates of the units A and B are driven in opposite directions, while the units C and D are likewise driven in opposite directions. The diameters of the plates 46 is such that the respective units are disposed in pairs with the component elements of each pair being arranged in a horizontally spaced relation sufficient to permit of the passage of cotton plant stalks between the respective elements of each pair of pickers.

Means are provided for guiding the cotton plants into the spaces between the respective picker units and at the same time causing the branches of the plants to be bent downwardly and forced into engagement with the rotating surfaces of the respective plates 46 whereby the cotton will be plucked from the branches by action of the fingers 47. This means comprises forwardly positioned vertical rods 48 having inturned end portions secured to the adjacent straps of their respective strap frames 36 and 37, the vertical portions of the rods 48 being disposed adjacent the peripheries of the plates 46 and forwardly thereof relative to the travel of the machine. These rods 48 are formed or suitably provided with rearwardly extending curved guide arms 49, which arms are equal in number to the number of picker plates in each unit and are located adjacent each of the picker plates. These arms 49 are of a length sufficient to extend substantially around one quarter of the peripheries of their adjacent picker plates 46 and they extend from their respective rods 48 in opposed relation with the major portion of their lengths extending laterally from the rods 48 in parallel relation to the picker plates. The terminal portions of these guide arms 49 are disposed in the space between the respective picker units and are therein down-turned at a relatively sharp inclination with the tip of each arm terminating slightly above the top of a guard positioned above the adjacent picker plate, as will now be described.

Over substantially the entire top of each picker plate 46 is disposed a guard in the form of a hood 50 arranged in parallel relation to the respective picker plates and spaced very slightly above the tips of the picker fingers 47, as best shown in Figure 1. These guards 50 extend over the entire top area of the forward portions of the picker plates and have depending side edge flanges 51 for enclosing the side or peripheral edges of the picker plates. These guards are suitably secured to the respective strap members 38, 39, 40 and 41 of the picker unit strap frames 36 and 37, being disposed thereon in the desired relation to the rotating picker mechanism.

It will be observed from this construction that the entire forward portions of the picker units will be so protected by means of the guards 50 and 51 that no part of the cotton plants may become engaged by the upstanding picker fingers 47 until the plant shall have passed rearwardly beyond that portion of the picker unit which is covered by the guards 50. During this rearward movement as the machine is drawn forwardly over the cotton rows, the branches of the cotton plant are engaged by the guide arms 49 and bent down into positive engagement against the top of the respective shields 50 being compressed between the shields 50 and the downwardly inclined portions of the guide arms 49.

Each of the picker units A, B, C and D has disposed adjacent the rear portion thereof, and adjacent the space provided for passage of cotton plants, a vertical suction conduit 52 which is suitably retained in rigid attached engagement on its respective strap frame 36 or 37 by means of bracket arms 53. At spaced, vertical intervals corresponding to the disposition of the picker plates 46, the conduits 52 are provided with laterally extending branches 54 which extend inwardly into the space between adjacent picker plates and each of which is provided with a flared mouth 55 spaced above the tops of the picker fingers 47 on the respective picker plates and formed with a covering grid or screen plate 56 which extends inwardly over the respective picker plate at an upward incline from the peripheral edge of the plate, as best illustrated in Figure 4. Adjacent the mouth 55 of the suction branch 54, each picker plate has its respective guard 50 cut away so as to permit passage of the branches of the cotton plant downwardly into engagement against the picker plate directly under the suction mouth 55. Conduits 57 connect the upper ends of the conduits 52 with the suction conduit 20 leading to the trash collecting fan 18 at one side of the machine frame.

Each of the picker units has a similarly mounted cotton suction conduit 58 arranged adjacent the outer portion at the rear of each respective picker unit and parallel with the conduits 52 just described. These cotton suction conduits 58 are provided with lateral branches 59 similar to the branches 54 already described and which extend into the space between the respective picker plates. The branches 59 are, however, provided with flared downturned suction mouths 60 which cover a relatively large adjacent area of the respective picker plate 46 which passes therebeneath, the mouth 60 being arranged with an opening disposed in parallel relation with the adjacent picker plate and spaced slightly above the tops of the picker fingers 47 so that cotton held on the picker fingers may pass in under the mouth 60 and be sucked up therethrough into the conduit 58. At their upper ends these conduits 58 connect with flexible conduits 61 which lead into the conduit 21 extending from the cotton suction fan assembly 19 at the top of the machine frame.

As the respective picker plates on the different units rotate in opposite directions, it will be apparent that due to the action of the guide arms 49, the branches of a cotton plant engaged by the picker will be forced downwardly into the spaces between the respective picker plates and the respective guards 50 up to the grids 56 on the respective branches 54 of the trash collecting conduits 52. As the first suction acting upon the cotton plants is through the conduits 52, it will be apparent that dead leaves, loose twigs, trash and other foreign material will be dislodged from the cotton plant through the combined action of the guide arms 49 and guard plates 50 and will be sucked up through the grids 56 into the trash collecting fan assembly 18 at one side of the machine. The mesh of the grid screens 56 is not large enough to permit passage therethrough of the cotton bolls and under the continuous rotation of the picker plates, these cotton bolls will be impaled upon the picker finger prongs 47 carrying the cotton from beneath the screens 56 to a point beneath the cotton suction mouth 60 of the conduits 58, at which points the suction is effective to draw the cotton from the fingers 47 up into the cotton collecting assembly 19.

It will thus be seen that means are provided in this machine for first separating trash and loose leaves and the like from the cotton before the cotton is picked from the plant. This feature is of tremendous value in the machine picking of cotton.

Inasmuch as it is not at all times desirable to employ the effective operation of the entire number of picker plates, I provide means for closing off a desired number of the uppermost picker plates, which may be employed in accordance with seasonal requirements. This means comprises arcuate doors 62 having vertical pivotal connection with the respective rods 48 at the upper portions of the rods whereby the doors or covers may be swung inwardly toward each other on the respective picker units to close over the external peripheral portions of the adjacent guards 50 and guide arms 49 whereby any portion of a cotton plant passing into engagement with the surface of the covers 62 when they are in closed position, will be prevented from engaging the uppermost picker means and will be directed merely into the space provided for the passage of the stalk of the cotton plant. In the drawings the closure plates 62 are shown in every instance as in full open position and it will be observed, especially from a consideration of Figure 3, that in their open positions, these closure members 62 by reason of their arcuate formation cooperate with the guide arms 49 to provide an effective means for gathering in the uppermost portions of the cotton plants and thereby preventing any spreading of the branches toward the outer portions of the picker units such as might tend to block the operation of the machine.

As not all cotton rows are developed in uniform spacing between the various rows and between individual plants of the rows, it becomes necessary to make provision for an adjustment of the picker units to accommodate for such variances. I have provided a means for accomplishing both an adjustable movement of the picker units laterally in the machine frame and vertically therein to accommodate rises and depressions in the surface of a field over which the machine travels. To this end the strap frames 36 and 37 of the picker units are disposed substantially intermediate the front and rear bars of the main frame 10 and are pivotally connected to the rear bars of the main frame by forwardly extending link rods 63 having eyes 64 formed on their opposite ends, which eyes are connected at the forward ends of the rods 63 in eye bolts 65 carried by the strap frames 36 and 37 at each side thereof. This particular mounting is best illustrated in Figure 6. The rear ends of the rods 63 have their eyes 64 pivotally connected in vertically depending bracket arms 66 rigidly secured on the bottom of the rear bar of the main frame, and between the lower ends of the brackets 66 and the respective side straps 38, 39, 40 and 41 of the frames 36 and 37, link rods 67 of identical construction with the rods 63 are disposed in pivotal connection at each end so that with respect to the brackets 66, the frames 36 and 37 may be moved in a plurality of directions to secure the desired adjustment of the picker units.

This adjusting movement is effected through the medium of an operating lever 68 pivoted intermediate its ends for vertical rocking movement between upright ears 69 formed on a rotatable plate 70, which plate is rotatably mounted on a standard 71 adapted to lie on the top face of the rear bar of the main frame 10 and having depending attaching ears 72 which engage opposite sides of the main frame bar so that suitable securing means may be passed through the apertures 73 provided in the ears 72 and through the frame bar for effecting a rigid mounting of the support 71 upon the main frame.

The plate 70 has formed integral therewith an upright rack sector 74 extending from the peripheral edge of the plate and provided with teeth adapted to be engaged by the slidable bolt 75 of a latch mechanism 76 mounted on the operating lever 68 and controlled through manipulation of the handle 77 as in the ordinary construction and operation of such latching device. Rearwardly of the machine the operating lever 68 is formed with a handle 78 and at its forward end the lever 68 is downwardly curved and terminates in an eye 79 through which is engaged a crank portion formed intermediate the ends of a rod 81 disposed transversely between the link rods 63 and connected to said rods by eyes 82 formed at each end of the said rod 81.

The plate 70 is further provided with a support 83 upon which is pivotally mounted the bell crank lever 84 having its long arm 85 extending over the forward peripheral edge of the plate 70 and terminating in a depending portion 86 adapted to be engaged between teeth 87 formed in the adjacent forward edge of the support 71 and a socket 88 formed in the peripheral edge of the plate 70, as best shown in Figure 7. The bell crank lever is rocked vertically to engage or disengage the portion 86 through means of an operating link 89 extending rearwardly to a pivoted actuating handle 90 carried by the operating lever 68 adjacent its handle 78 and on the side opposite the handle 77 of the latching mechanism. It will be obvious that a compression of the handles 77 and 90 against the handle 78 will release the latching means above described so that the operating lever 68 may be rotated in a horizontal plane and at the same time elevated or depressed at its forward end in a vertical plane, whereby the connection with the rod 81, the respective strap frame 36 or 37 is moved into the desired adjusted position.

While in this preferred illustrative embodiment of the invention I have illustrated and described certain details entering into the construction and operation thereof, I desire it to be understood that the invention is not to be limited thereby but that any desired changes and modifications may be made in the structural details as will fall within the scope of the invention as claimed.

I claim:

1. A cotton picking machine comprising a carrier frame, a plurality of rotatable picker units disposed therein, means carried by said frame for rotating said units, means on said units for guiding branches of cotton plants into positive engagement with said units, suction means for plucking cotton from plants engaged by the units, suction means operating in advance of the plucking means for extracting trash material from the cotton plants, and means for adjusting said picker unit mechanism vertically in said frame.

2. A cotton picking machine comprising a carrier frame, a plurality of vertically spaced picker members rotatably mounted therein, means in said frame for rotating said units, cotton plant guide members disposed adjacent each of said picker units, and means carried by said units for selectively rendering certain of said units inoperable on cotton plants engaged by the machine.

3. A cotton picking machine comprising a carrier frame, a plurality of supplemental frames disposed therein, means for adjustably moving said supplemental frames relative to said carrier frame, a plurality of spaced vertical parallel shafts rotatably mounted in said supplemental frames, means on said carrier frame for rotating said shafts, a plurality of plates disposed in vertically spaced relation on said shafts and rotatable therewith, picker fingers disposed on said plates, guards carried by said supplemental frames and disposed over the major portion of each of said plates and picker fingers, and means in said supplemental frames for guiding cotton carrying portions of cotton plants into engagement with the exposed areas of said plates as the machine travels over cotton rows.

4. A cotton picking machine comprising a carrier frame, a supplemental frame disposed therein, means for adjustably moving said supplemental frame relative to the carrier frame, a pair of parallel shafts vertically mounted in spaced relation in said supplemental frame, means on said carrier frame for rotating said shafts, a plurality of rotating picker members disposed in vertical spaced relation on said shafts with a vertical passageway therebetween for the reception of cotton plant stalks, suction means disposed adjacent each of said picker members and in vertical alignment, secondary suction means disposed adjacent each of said picker members in vertical alignment and in spaced relation from said first named suction means, and means carried by said supplemental frame for guiding portions of cotton plants into positive engagement with said picker members adjacent said first named suction means.

5. A cotton picking machine comprising a carrier frame, supplemental frames disposed therein in transverse spaced relation, means for adjusting each of said supplemental frames in a plurality of directions relative to said main frame and to each other, vertically disposed transversely spaced picker units disposed in each of said supplemental frames, a plurality of suction elements disposed adjacent each of said picker units, and a common means on said carrier frame for operating all of said picker units and suction means.

6. In a cotton picking machine, the combination with a rotary picking unit comprising a plurality of vertically spaced picker members, of means mounted on said unit for selectively rendering a portion of said picker members inoperable.

In testimony whereof I affix my signature.

JAMES P. CRUISE.